United States Patent [19]

Loonen

[11] Patent Number: 5,255,092
[45] Date of Patent: Oct. 19, 1993

[54] PICK-UP AND/OR DISPLAY DEVICE, AND AN IMAGING SYSTEM COMPRISING SUCH A DEVICE

[75] Inventor: Antonie R. M. Loonen, Eindhoven, Netherlands

[73] Assignee: U.S. Philips Corp., New York, N.Y.

[21] Appl. No.: 795,422

[22] Filed: Nov. 20, 1991

[30] Foreign Application Priority Data

Dec. 3, 1990 [NL] Netherlands ................ 9002652

[51] Int. Cl.[5] .................. H04N 5/14; H04N 5/67; H04N 5/6
[52] U.S. Cl. .................. 358/160; 358/151; 358/150; 358/111
[58] Field of Search .............. 358/160, 111, 140, 150, 358/148, 151, 22, 11, 158, 110, 112, 113, 180

[56] References Cited

U.S. PATENT DOCUMENTS

| | | | |
|---|---|---|---|
| 4,668,974 | 5/1987 | Kita et al. | 358/150 |
| 4,754,330 | 6/1988 | Spieth | 358/148 |
| 4,772,950 | 9/1988 | Furuhata et al. | 358/160 |
| 4,780,759 | 10/1988 | Matsushima et al. | 358/148 |
| 5,045,939 | 9/1991 | Okayama et al. | 358/140 |

Primary Examiner—Victor R. Kostak
Assistant Examiner—Michael H. Lee
Attorney, Agent, or Firm—Jack D. Slobod

[57] ABSTRACT

A pick-up and/or display device comprises a memory in which a video signal is written at a write frequency under the control of a clock and is read therefrom at a read frequency. Image expansion or image compression can thus be realized. The clock, a clock input of which is connected to a synchronizing pulse generator, comprises an oscillator having an adjustable frequency, an oscillator output constituting a clock output and being connected to a frequency divider whose output signal is applied to an integrating comparator circuit, an output signal variation of which is proportional to a difference between a mean input signal and a predetermined reference voltage, the comparator circuit being connected to a frequency set input of the oscillator, the oscillator comprising a trigger input which serves to switch the oscillator on and off and which constitutes the clock input.

A clock of this kind exhibits an accurate phase relationship with the synchronizing signal which is not subject to temperature drift and noise. The frequency of the clock can be accurately adjusted by adjustment of the reference voltage.

11 Claims, 1 Drawing Sheet

PICK-UP AND/OR DISPLAY DEVICE, AND AN IMAGING SYSTEM COMPRISING SUCH A DEVICE

FIELD OF THE INVENTION

The invention relates to a pick-up and/or display device, comprising a memory for the storage of a video signal, a clock for the supply of write or read clock pulses to the memory, and a synchronizing pulse generator for applying synchronizing pulses to a clock input of the clock.

BACKGROUND OF THE INVENTION

A pick-up and display device of this kind is known from European Patent Application EP 0 213 912-A2.

The cited Patent Application describes a pick-up and display device in which a video signal of a television image having a 5:3 aspect ratio is compressed in a line direction in the television pick-up device so as to form a video signal associated with an image having a 4:3 aspect ratio. To this end, in the television pick-up device the video signal is digitized and written into a line memory at a first clock frequency which is generated by a first clock. This clock comprises, for example a phase-locked loop and generates 1100 clock pulses within a line period, so that an image line is composed of 1100 pixels. During reading the video signal is sampled so that one or two pixels are lacking between two neighboring pixels in each image line in the line memory. The line memories are read by a second clock which generates clock pulses having a second clock frequency, for example amounting to 910 times the line frequency. Both clocks are controlled by the line synchronizing signal. Because an image line read from the line memory contains fewer pixels than an image line written into the line memory, image compression occurs. When the compressed video signal is displayed on an image display unit having a 4:3 aspect ratio, the video signal remains compressed. When the video signal is displayed on an image display unit having a 5:3 aspect ratio, the video signal is again written into a line memory in the television display device at a frequency equal to the read frequency prior to the image compression. When the line memory is subsequently read at the frequency equal to the write frequency prior to the image compression, the image compression is cancelled.

SUMMARY OF THE INVENTION

It is an object of the invention to provide a television pick-up and/or display device of the kind set forth in which a clock frequency can be accurately adjusted and in which the clock signal has a fixed phase with respect to a reference signal, notably a line synchronizing signal.

To achieve this, a pick-up and/or display device in accordance with the invention is characterized in that the clock comprises an oscillator having an adjustable frequency for supply of an output signal to the memory and to an integrating comparator circuit which is suitable to produce an output signal variation which is proportional to a difference between a mean input signal and a predetermined reference voltage for supply to a frequency set input of the oscillator, the oscillator hau a trigger input which is coupled to the synchronizing pulse generator in order to switch the oscillator on and off.

Because the oscillator is triggered by the synchronizing pulse generator, notably the line synchronizing pulse generator, the oscillator always has the correct phase with respect to the line synchronizing signal. This offers inter alia the advantage that the image information read from the memory for each image line appears in the same horizontal position on the display screen of the image display unit, thus preventing so-called phase jitter. The frequency of the clock can be simply adjusted to a multiple of the line frequency by adaptation of the reference voltage of the comparator circuit. Another advantage of such a clock consists in that, contrary to the known phase-locked loops, the phase of the oscillator with respect to the line synchronizing signal is not determined exclusively for one integer frequency ratio of the oscillator frequency to the line synchronizing frequency and that the clock is insensitive to thermal drift and noise. Furthermore, the frequency of the oscillator can be highly accurately adjusted to a freely adjustable multiple (which need not necessarily be an integer multiple) of the frequency of the synchronizing signal by adjustment of the reference voltage of the comparator circuit.

A further embodiment of a pick-up and/or display device in accordance with the invention is characterized in that the oscillator is coupled to the integrating comparator circuit via a frequency divider. The frequency of the oscillator is adjusted by means of the frequency divider and the integrating comparator circuit. When the integrated output signal of the frequency divider is equal to the predetermined reference voltage within a line period, the frequency of the oscillator becomes constant.

The frequency divider is preferably formed by a counter which is connected to the synchronizing pulse generator by way of a trigger input for resetting to zero. The oscillator preferably comprises a voltage-controlled oscillator.

A pick-up and/or display device in accordance with the invention can be used in an imaging system comprising an image pick-up device which includes an image pick-up face and an optical system for imaging a circular object plane as an ellipse on the image pick-up face, the image pick-up device being connected to a memory of a television pick-up and/or display device in accordance with the invention, which memory is connected to an image display unit for displaying a circular object plane as a circular image.

In an imaging system comprising an X-ray examination apparatus, the optical system images a circular image of an exit screen of an X-ray image intensifier tube as an ellipse on a rectangular CCD sensor. In comparison with the case where a circular image were imaged as an inscribed circle on the rectangular CCD sensor, the horizontal resolution of the image picked up is thus enhanced. Such an X-ray examination apparatus is disclosed in European Patent Application EP 0 295 728-A1. The video signal from the CCD sensor is stored in an image memory having a predetermined write frequency. When the image memory is read, the read clock frequency is higher than the write clock frequency, thus giving rise to image compression so that the circular image of the exit screen of the X-ray image intensifier tube is again displayed as a circle on an image display unit.

The use of a television pick-up and/or display device in accordance with the invention is also attractive for imaging systems such as endoscopes, microscopes and other imaging systems comprising a circular object plane and a rectangular image pick-up device, and in systems in which image transformation is used, for example interactive image display devices comprising an optical data carrier such as digital or analog optical video discs.

BRIEF DESCRIPTION OF THE DRAWING

The invention will be described in detail hereinafter with reference to the accompanying drawing. Therein.

DESCRIPTION OF THE PREFERRED EMBODIMENT

Figure 1:
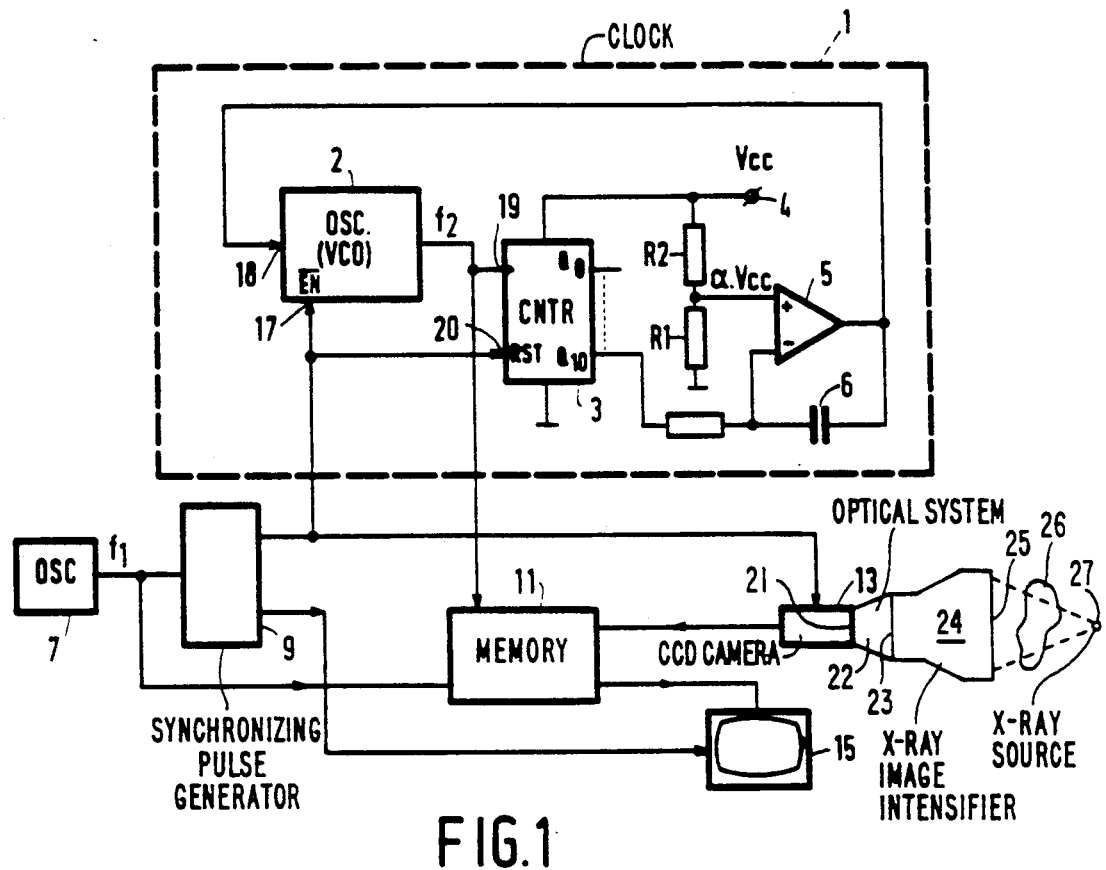
FIG. 1 shows a block diagram of a clock for use in a television pick-up and/or display device in accordance with the invention.

FIG. 1 shows a clock 1, comprising a voltage-controlled oscillator (VCO) 2, a frequency divider realized as a counter 3, a comparator circuit comprising an amplifier 5 and a capacitor 6, an oscillator 7, a synchronizing pulse generator 9, a memory 11, an image pick-up device 13, and an image display unit 15. An image pick-up face in the image pick-up device 13, for example a CCD camera, is line-wise read under the control of the synchronizing pulse generator 9. Camera 13 has the usual rectangular pick-up face 21 which is coupled via optical system 22 to the circular exit screen 23 of an X-ray image intensifier 24. An input face 25 of image intensifier 24 is irradiated by an X-ray radiation from an X-ray source 25 after attenuation by an object 27 to be examined. The optical system 22 compresses an image of circular exit screen 23 in a line scan direction to an elliptical shape in order to make maximum use of the rectangular pick-up face 21.

Figure 2:
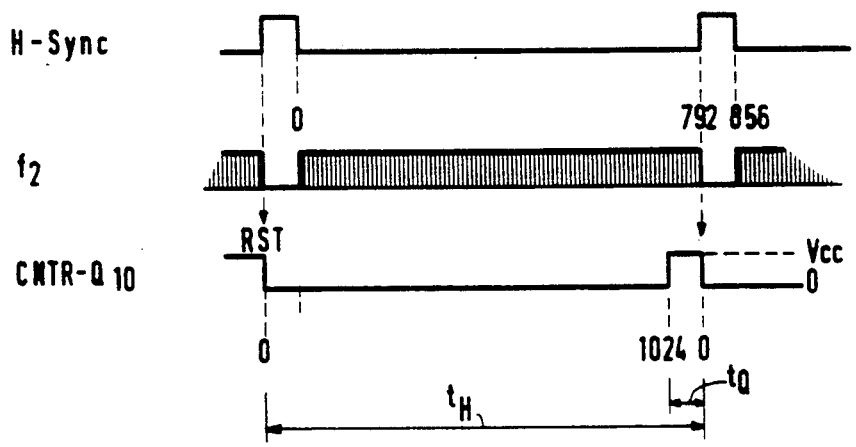
FIG. 2 shows diagrammatically the pulse sequences in a television pick-up and/or display device in accordance with the invention.

This elliptical shape is then electronically converted to a circular shape. Accordingly, the video signal generated by the image pick-up device 13 is stored in the memory 11 which is, for example a line memory. A first clock signal having a write frequency f1 is applied to the memory 11 by the oscillator 7. When the video signal stored in the memory 11 is displayed on the image display unit 15, the video signal is read from the memory 11 at a read frequency f2 which is greater than write frequency f1. The video signal modulates the intensity of an electron beam which frame-wise scans a display screen in the image display unit 15 under the control of the synchronizing pulses. The synchronizing pulse generator 9 applies line synchronizing pulses to a trigger input 17 of the voltage-controlled oscillator 2, which pulses have a sequence as designated by the reference H-sync in FIG. 2. One period of the line synchronizing pulses comprises 856 write clock pulses and the pulse width of the line synchronizing pulses amounts to (856−792) write clock pulses. The line synchronizing pulse H-sync triggers the counter 3 which is a 1024 counter in the present embodiment but which is in a most general sense an N-counter, where N may also have the value 1. The counter counts the number of positive going edges of the pulses appearing on its input 19. The input signal of the counter 3, having the read clock frequency f2, is designated by the reference f2 in FIG. 2. The signal designated by the reference CNTR-Q10 in FIG. 2 appears on the output Q10 of the counter 3. The frequency f2 of the voltage-controlled oscillator 2 becomes constant if the mean value of the output signal of the counter 3 is equal to the reference voltage $\alpha V_{cc}$, the supply voltage $V_{cc}$ being applied to a terminal 4. The factor $\alpha$ equals $R1/(R1+R2)$. When the frequency of the voltage-controlled oscillator 2 is constant: $(tQ/tH)V_{cc} = \alpha V_{cc}$. Therein, tH is the line period and tQ is the period of time during which the output of the counter 3 is high. For the line period tH it holds good that $tH = 856/f1$ and for tQ that $tQ = 792/f1 - 1024/f2$. The ratio of the write frequency f1 to the read frequency f2 is thus found: $f1/f2 = 0.773 - 0.836\alpha$. The ratio of the write frequency to the read frequency is independent of the supply voltage $V_{cc}$ and hence is free from noise and drift. The factor 0.773 in the expression for the ratio of the write frequency f1 to the read frequency f2 is determined exclusively by the dividends of the synchronizing frequency and the counter 3 and is free from tolerances. This factor is preferably chosen so that it approximates a desired frequency ratio as well as possible, thus enabling fine control by variation of the second term, i.e. $0.836\alpha$. To this end, one of the resistors R1 and R2 may be constructed as a variable resistor, or instead of two resistors use can be made of a controlled voltage source which produces, for example the deviation of the oscillation frequency from the mains frequency.

I claim:

1. A video processing device comprising:
   a memory for storing a video signal;
   a clock for supplying read pulses to the memory; and
   a synchronizing pulse generator for applying synchronizing pulses to a clock input of the clock;
   wherein said clock comprises an oscillator having an output signal at an output of the oscillator which is adjustable in frequency in response to a frequency set signal at a frequency set input of the oscillator, said output of the oscillator coupling said output signal to the memory and to an integrating comparator circuit having an output coupled to the frequency set input of the oscillator, said integrating comparator circuit being configured to vary the frequency set signal at said frequency set input when there is a difference between a mean input signal and a predetermined reference voltage, the oscillator having a trigger input which comprises the clock input of said clock, the synchronizing pulses from said synchronizing pulse generator being for switching the oscillator off and on.

2. A video processing device as claimed in claim 1, wherein the oscillator is coupled to the integrating comparator circuit via a frequency divider.

3. A video processing device as claimed in claim 2, wherein the frequency divider comprises a counter.

4. A video processing device as claimed in claim 3, wherein the counter has a trigger input which is connected to the synchronizing pulse generator.

5. A video processing device as claimed in claim 1 wherein the oscillator comprises a voltage-controlled oscillator.

6. A video processing device as claimed in claim 1 wherein the synchronizing pulse generator generates line synchronizing pulses.

7. An imaging system, comprising an image pick-up device which includes an image pick-up face and an optical system for imaging a circular object plane as an ellipse on the image pick-up face, the image pick-up device (13) being connected to the memory of a video processing device as claimed in claim 1, said memory being connected to an image display unit for displaying a circular object plane as a circular image.

8. An imaging system as claimed in claim 7, comprising an X-ray source, an X-ray image intensifier which is arranged so as to face the X-ray source and which comprises an exit window, the image pick-up device being arranged so as face the exit window, the optical system being arranged between the exit window and the image pick-up device.

9. A clock suitable for use in a video processing device as claimed in claim 1.

10. A video processing device as claimed in claim 4 wherein the oscillator comprises a voltage-controlled oscillator.

11. A video processing device as claimed in claim 10 wherein the synchronizing pulse generator generates line synchronizing pulses.

* * * * *